United States Patent [19]

Johnson et al.

[11] Patent Number: 5,118,562
[45] Date of Patent: Jun. 2, 1992

[54] VIBRATION DAMPER HAVING EXTENDED TEMPERATURE RANGE AND LOW TEMPERATURE SHOCK RESISTANCE

[75] Inventors: Roger W. Johnson, Shoreview; William D. Sell, St. Paul; Charles D. Wright, Birchwood, all of Minn.

[73] Assignee: Minnesota Mining and Manufacturing Co., St. Paul, Minn.

[21] Appl. No.: 587,087

[22] Filed: Sep. 24, 1990

[51] Int. Cl.⁵ .................................................. B32B 5/16
[52] U.S. Cl. ........................................ 428/327; 428/461; 428/463; 428/483; 428/520; 428/522
[58] Field of Search ............... 428/327, 461, 463, 483, 428/520, 522

[56] References Cited

U.S. PATENT DOCUMENTS

| | | | |
|---|---|---|---|
| 2,802,809 | 8/1957 | Hayes | 260/45.5 |
| 2,943,074 | 6/1960 | Feuer | 260/45.5 |
| 3,251,904 | 5/1966 | Souder et al. | 260/876 |
| 3,271,188 | 9/1966 | Albert et al. | 428/463 |
| 3,537,717 | 11/1970 | Caldwell | 280/11.13 |
| 3,640,833 | 2/1972 | Oberst et al. | 161/165 |
| 3,640,836 | 2/1972 | Oberst et al. | 161/165 |
| 3,640,839 | 2/1972 | Ochiai | 162/129 |
| 3,671,610 | 6/1972 | Amagi et al. | 260/880 R |
| 3,674,624 | 7/1972 | Oberst et al. | 161/216 |
| 3,674,625 | 7/1972 | Oberst et al. | 161/165 |
| 3,678,133 | 7/1972 | Ryan | 260/876 R |
| 3,793,402 | 2/1974 | Owens | 260/876 R |
| 3,833,404 | 9/1974 | Sperling et al. | 117/63 |
| 3,847,726 | 11/1974 | Becker et al. | 161/186 |
| 3,899,547 | 8/1975 | Amagi et al. | 260/876 R |
| 4,223,073 | 9/1980 | Caldwell et al. | 428/422 |
| 4,408,238 | 10/1983 | Hearn | 360/104 |
| 4,447,493 | 5/1984 | Driscoll et al. | 428/332 |
| 4,539,375 | 9/1985 | Dunkelberger | 525/260 |
| 4,681,816 | 7/1987 | Hashimoto et al. | 428/463 |
| 4,760,478 | 7/1988 | Pal et al. | 360/104 |

FOREIGN PATENT DOCUMENTS

| | | |
|---|---|---|
| 0257984 | 9/1988 | European Pat. Off. |
| 0349216 | 1/1990 | European Pat. Off. |
| 0352901 | 1/1990 | European Pat. Off. |
| 2132639 | 6/1987 | Japan . |
| 2-238931 | 9/1990 | Japan . |

*Primary Examiner*—Merrell C. Cashion, Jr.
*Assistant Examiner*—D. S. Nakarani
*Attorney, Agent, or Firm*—Gary L. Griswold; Walter N. Kirn; Steven E. Skolnick

[57] ABSTRACT

Constrained layer damping structures are often based on viscoelastic layers of iso-octyl acrylate:acrylic acid or analogous copolymers. As the acrylic acid content is increased, the peak damping temperature also increases; unfortunately, however, the copolymer becomes more brittle and susceptible to shock, especially at low temperatures. Incorporating small amounts of rubbery polymer particles (especially core-shell polymers) in the viscoelastic copolymer alleviates this problem.

13 Claims, No Drawings

VIBRATION DAMPER HAVING EXTENDED TEMPERATURE RANGE AND LOW TEMPERATURE SHOCK RESISTANCE

BACKGROUND OF THE INVENTION

This invention relates to vibration damping, to compositions having particular use for vibration damping, and to constrained layer damping devices.

It has long been known that certain viscoelastic compositions have utility in damping the vibration of substrates to which they are applied. It has also been known that viscoelastic compositions are particularly effective in so-called "constrained layer" damping structures, where a thin layer of viscoelastic composition is bonded to the vibrating substrate, with a relatively inextensible "constraining layer" bonded to the exposed surface of the composition; see, e.g., U.S. Pat. Nos. 3,537,717, 3,640,833, 3,640,836, 3,640,839, 3,674,624, 3,674,625, 3,833,404, 3,847,726, 4,223,073, 4,408,238, 4,447,493, 4,681,816, and 4,760,478.

Copolymers of non-tertiary alkyl acrylates and polar monomers (e.g., iso-octyl acrylate:acrylic acid copolymers) are known to possess viscoelastic properties that are suitable for damping. It is also known that as the amount of polar monomer increases, the peak damping temperature (i.e., the highest temperature at which the copolymer damps effectively) increases. Such copolymers are thus useful in damping the vibration of structures associated with internal combustion engines, where the working temperature approximates that of boiling water, or 100° C.; indeed, oil may reach 150° C. Unfortunately, however, as the amount of polar monomer increases above 20%, the copolymer becomes increasingly brittle and susceptible to shock at room temperature or below. Thus, for example, when a constrained layer damping structure based on a high acid iso-octyl acrylate:acrylic acid copolymer is applied to the oil pan or tappet valve cover of an automobile, any shock encountered during the warm-up period is likely to cause the structure to loosen or even fall off. Regardless of how effective such a structure might have been at elevated temperatures, it will, of course, be considered unsatisfactory.

SUMMARY

The present invention provides a constrained layer damping structure that not only carries out its vibration damping function effectively at a wide range of temperatures but also remains firmly attached, resistant to shock, even at comparatively low temperatures. Like prior art constrained layer damping structures, the product of the invention comprises a stiff constraining sheet, to one surface of which is firmly adherently bonded a layer of viscoelastic material. In accordance with the invention, the viscoelastic material comprises (a) a matrix consisting essentially of an inherently brittle copolymer of monomers consisting essentially of
  (1) at least one alkyl acrylate ester of non-tertiary alcohol having 1-14 carbon atoms and
  (2) at least one copolymerizable polar monomer and
(b) dispersed throughout said viscoelastic material, a multiplicity of rubbery particles.

It is believed that the rubbery particles stop the propagation of cracks, which dissipate at the rubber. It is also believed that the rubbery particles toughen the copolymer by enabling microsections of the matrix to slide over each other. In a particularly preferred embodiment, the rubbery particles are core-shell polymers consisting essentially of a rubbery core surrounded by, and graft-polymerized to, a thin shell of polymeric material that is compatible with the copolymeric matrix. Since rubber is nonpolar and hence may not have a surface to which the polar matrix readily adheres, the compatible shell is substantially more receptive to the acrylate copolymer.

In damping structures incorporating copolymers of this type, the peak damping temperature is directly related to the amount of polar monomer present. (In an iso-octyl acrylate:acrylic acid copolymer, the crylic acid will constitute at least 20% of the original monomers. Below 20% acrylic acid, brittleness and shock resistance at low temperatures are generally not problems, but the peak damping temperature is not as high as desired.) The upper limit of polar monomer in the copolymer can be 30 or 40%, or even higher. As a matter of practicality, however, the amount of polar monomer will probably be only high enough to achieve a peak damping temperature equal to, or slightly in excess of, the working temperature likely to be encountered during use. In any event, there is no apparent reason for increasing the peak damping temperature to a value exceeding the degradation temperature of the copolymer.

Although iso-octyl acrylate is a presently preferred alkyl acrylate for use in preparing copolymer damping matrices, such other monomers as butyl acrylate are also satisfactory. Since the corresponding methacrylates are useful, the terms "acrylate" and "acrylic ester" as used herein are intended to include both acrylate and methacrylate monomers As a general rule, the shorter the alkyl chain in the acrylate monomer, the greater the tendency toward brittleness in the copolymer. To reduce brittleness, the amount of core-shell polymer can be increased.

Similarly, although acrylic acid is a presently preferred copolymerizable polar monomer, a number of other polar monomers can also be employed, e.g., methacrylic acid, acrylamide, N-substituted acrylamide, hydroxyalkyl acrylates, cyanoalkyl acrylates, maleic anhydride, and itaconic acid. Provided that an adequate amount of strongly polar copolymerizable monomers is present, such less polar monomers as N-vinyl-2-pyrrolidone, N-vinyl caprolactam, acrylonitrile, methacrylonitrile, vinyl chloride, and dialkylphthalate may also be present.

Core-shell polymer particles are well known as elastomeric impact modifiers for rigid thermoplastic polymers; see, e.g., U.S. Pat. Nos. 2,802,809, 3,678,133, 3,251,904, 3,793,402, 2,943,074, 3,671,610, 3,899,547, and 4,539,375. These particles are, by and large, spherical, or at least spheroidal. Although not especially critical, the diameter of the particles should be somewhat less than the thickness of the layer of viscoelastic material in order to obtain the full brittleness-reducing effect. Since a satisfactory thickness for the viscoelastic layer is about 125 micrometers (5 mils), the effective diameter of the core-shell polymer particles (or other rubbery particles) should generally not exceed that figure.

One commercially available core-shell polymer has a polybutadiene core and a butyl acrylate shell. It has been found that viscoelastic compositions incorporating 2-15 parts by weight of rubbery polymer particles per 100 parts of copolymer matrix yield improved results. More predictably improved results are obtained with 5 parts of the rubbery polymer particles, and it does not appear that more than 10 parts contributes any additional improvement in brittleness reduction or low temperature shock resistance; accordingly, 5-10 parts are preferred, 6 parts being especially satisfactory for most purposes.

Viscoelastic layers are thicker than 125 micrometers, but the increased cost generally militates against their use. Significantly reducing the viscoelastic layer thickness below 25 micrometers tends to attenuate the effect of the layer.

The constraining layer should be as thin as practical in the specific circumstances encountered. As previously noted, this layer should have a high tensile modulus to effectively restrain the viscoelastic layer. Depending on the end use of the vibration-damping structure, suitable constraining layers include biaxially oriented polyethylene terephthalate, aluminum foil, stainless steel, polyphenylene sulfide film, thermoplastic, or thermosetting polymers reinforced with fibers of glass, metal, carbon, or ceramic etc. The structure being damped may have a thickness that is equal to (or even less than) that of the constraining layer just described. In some circumstances it may be desirable to sandwich viscoelastic material between two sheets, from which parts may subsequently be formed by die cutting, deep drawing, etc.

Although in most instances the viscoelastic layer will be sufficiently adhesive to bond directly to the vibrating structure, there may be situations where a separate adhesive is employed. In such event, the adhesive should be applied in as thin a layer as possible, so as not to detract from the vibration damping properties provided by the viscoelastic layer.

Shock sensitivity of a given viscoelastic material can be measured qualitatively by a modified form of Test PSTC-14.* To perform this test, a tape is made by coating the viscoelastic material on polyester film to a thickness of perhaps 50 micrometers, first priming the film if necessary to obtain satisfactory adhesion, bonding the exposed surface of the viscoelastic layer to a metal substrate, and peeling the tape away at an angle of 90°, at a rate of 25-30 cm/minute under room temperature conditions. A shock-resistant adhesive will remove smoothly, while one that is shock-sensitive will pull away in an erratic, raspy manner.

* Cf. "Test Methods for Pressure Sensitive Tapes," Pressure Sensitive Tape Council, Glenview, Ill. 60025-1377

DETAILED DESCRIPTION

Test Procedures

Peak Damping Temperature.

Bulk viscoelastic properties are measured by dynamic mechanical thermal analysis (DMTA) using Polymer Lab's Dynamic Mechanical Thermal Analyzer, Model Mark II, as detailed in ASTM Test Procedure D 4065-82. A frequency of 100 Hz is taken as representative of vibration in the 1-300 Hz range, and the temperature at which the greatest loss factor occurs is designated the "peak damping temperature."

T-Peel Adhesion

A solution of the damping material to be tested is coated onto a release liner in a layer thick enough to leave a dried coating about 25 μm thick and allowed to air dry for 10 minutes. The coated liner is then placed in an 80° C. oven for 5 minutes and cut into 152-mm × 211-mm strips. The exposed surface of the damping material is then applied to a primed 525-micrometer cold rolled steel panel that is about 300 mm long. The layup is oven-dried at 150° C. for 2 minutes, the release liner removed, a second identically primed cold rolled steel panel placed in contact with the newly exposed surface of the damping material, and a hand-cranked washer wringer used to laminate the panels and damping material together The laminate is placed in a 150° C. oven for 5 minutes, allowed to cool for at least 24 hours at room temperature, and cut into test strips 25 mm wide. The unbonded ends of the test panels are spread outward and gripped in the opposing jaws of a tensile testing machine. The jaws are then separated at 254 mm/minute, measuring the force required in lbs and converting it to N/dm width.

Understanding of the invention will be enhanced by referring to the following illustrative but nonlimiting examples, in which all parts and percentages are by weight unless otherwise noted.

EXAMPLE 1

To a matrix of 100 parts (based on total solids) of a 25% solids ethyl acetate solution of 75:25 iso-octyl acrylate:acrylic acid copolymer (number average molecular weight about 2,000,000, polydispersity about 1.0) was added 9 parts of core-shell polymer having a styrene-butadiene core and a methyl methacrylate shell containing a very small amount of styrene, the average diameter being about 300 μm (commercially available from Rohm and Haas under the trade designation "BTA-731) and mixing carried out. The copolymer of the matrix had been prepared by polymerization using a conventional free radical process in a nitrogen atmosphere, using azo-(bis-isobutyronitrile) ("VAZO 64") as the initiator. The mixture was then coated onto a 250-micrometer sheet of steel and oven-dried at 150° C. for 2 minutes to remove the solvent, leaving a layer of particle-filled viscoelastic polymer about 25 micrometers thick. The resultant product was tested according to the procedures previously described, results being summarized in Table I. Comparative sample 1-C, differing from the product of Example 1 only in that the core-shell polymer particles were omitted, was also prepared and tested.

EXAMPLES 2, 3, 5-9 AND SELECTED COMPARATIVE EXAMPLES 2

These examples were prepared in the same way as Examples 1 and 1-C except that different IOA:AA ratios and different amounts of BTA-731 were used. In some examples a thicker viscoelastic layer was evaluated. Results are shown in Table I.

EXAMPLES 10-12

These examples were prepared in the same way as Example 1 except that different types and amounts of rubbery polymer particles were employed. Results are shown in Table II.

TABLE I

| Example | IOA:AA Ratio | Rubbery Polymer Particle Type | Rubbery Polymer Particle Parts | Thickness of Visco-elastic Layer, μm | Peak Damping Temperature at 100 Hz, °C. | Room Temperature T-Peel Values, N/dm at Indicated Crosshead Speed in Cm/Min. | | | | | |
|---|---|---|---|---|---|---|---|---|---|---|---|
| | | | | | | 0.5 | 1.2 | 2.5 | 5.0 | 12.5 | 25.4 |
| 1 | 75:25 | BTA-731 | 9 | 25 | 90 | 253 | 291 | 246 | 239 | 259 | 277 |
| 1-C | " | — | — | " | 80 | 200 | 218 | | Shock Failure | | |
| 2 | " | BTA-731 | 6 | 36 | 81.5 | 387 | 387 | 405 | 405 | 405 | 405 |
| 3 | 70:30 | " | 6 | " | 92.5 | 211 | 211 | 194 | 176 | 158 | Shock Failure |
| 4-C | " | — | — | 31 | 101.5 | 70 | 53 | | Shock Failure | | |
| 5 | 75:25 | BTA-731 | 4.5 | 25 | 87.5 | 274 | 320 | 364 | 323 | 352 | 370 |
| 6 | " | " | 2.25 | " | 88.0 | 291 | 264 | 334 | 361 | 352 | 326 |
| 7 | " | " | 6 | " | 86.5 | 211 | 211 | 194 | 229 | 246 | 229 |
| 7-C | " | — | — | " | 81.5 | 211 | 211 | 211 | | Shock Failure | |
| 8-C1 | 81:19 | BTA-731 | 6 | " | N/A | 299 | 299 | 316 | 316 | 298 | 263 |
| 8-C2 | " | — | — | " | 45.0 | 316 | 370 | 405 | 421 | 439 | 351 |
| 9-C1 | 86:14 | BTA-731 | 6 | " | N/A | 106 | 106 | 141 | 176 | 211 | 246 |
| 9-C2 | " | — | — | " | 37.0 | 141 | 158 | 194 | 194 | 229 | 246 |

Comparative Examples 8-Cl and 8-C2, 9-Cl and 9-C2 show that when the amount of acrylic acid in the copolymer is less than 20%, there is no problem with low temperature shock, whether or not rubbery particles are included in the copolymer matrix. On the other hand, it will be noted that the peak damping temperature is significantly lower than for the high-acid compositions of the invention.

Examples 1,1-C, 4-C, 7 and 7-C, show that the peak damping temperature is directly related to the acid content of the IOA:AA copolymer; on the other hand, the higher the acid content, the greater the copolymer's susceptibiltiy to shock, and the more important is the incorporation of rubbery particles. It is believed that Example 4-C would have shown satisfactory shock resistance if more rubbery polymer particles (e.g., 9 parts) had been incorporated in the copolymer matrix.

TABLE II

| Example | IOA:AA Ratio | Rubbery Polymer Particle Type | Rubbery Polymer Particle Parts | Thickness of Visco-elastic Layer, μm | Peak Damping Temperature at 100 Hz, °C. | T-Peel Values, N/dm at 25.4 cm/min. Crosshead Speed at Temperatures Noted*** | | | | | | |
|---|---|---|---|---|---|---|---|---|---|---|---|---|
| | | | | | | 24 | 23 | 16 | 11 | 8 | 6 | 3 |
| 10 | 75:25 | BTA-731 | 6 | 28 | 89.5 | 510 | 528 | 458 | 282 | 528 | 528 | Shock Failure |
| 11 | " | SBR* | 6 | 30 | — | 440 | 475 | 458 | 422 | 704 | 352 | Shock Failure |
| 12 | " | Acrylate** | 6 | 23 | — | 440 | 440 | 493 | 493 | 704 | 475 | Shock Failure |

*Styrene:butadiene rubber particles, made by freezing and pulverizing rubber slabs obtained from Polysar, Ontario, Canada, under the trade designation "S-1018"
**Core-shell polymer having a rubbery butyl acrylate polymer core and a methyl methacrylate shell, available from Rohm and Haas under the trade designation "KM-330"
***all temperatures are in °C.

It will be appreciated that small amounts of such conventional additives as dyes, pigments, fillers, antioxidants and the like may also be incorporated in the copolymer matrix without having any appreciable effect on performance.

We claim:

1. A damping structure comprising in combination a stiff constraining sheet, to one surface of which is firmly adherently bonded a layer of viscoelastic material that comprises
   (a) a matrix consisting essentially of a brittle copolymer of monomers consisting essentially of
      (1) at least one alkyl acrylate ester of non-tertiary alcohol having 1-14 carbon atoms and
      (2) at least one copolymerizable polar monomer, and
   (b) dispersed throughout said viscoelastic material, a multiplicity of rubbery particles, the rubbery particles consisting essentially of a rubbery core surrounded by a thin shell of polymeric material that is compatible with the copolymer matrix.

2. The damping structure of claim 1 wherein the copolymer is an iso-octyl acrylate:acrylic acid copolymer.

3. The damping structure of claim 2 wherein the copolymer contains at least 20% acrylic acid.

4. The damping structure of claim 2 wherein the copolymer contains at least 25% acrylic acid.

5. The damping structure of claim 2 wherein the copolymer contains at least 30% acrylic acid.

6. The damping structure of claim 1 wherein the viscoelastic material contains 1-15% core-shell polymer.

7. The damping structure of claim 1 wherein the viscoelastic material contains 5-10% core-shell polymer.

8. The damping structure of claim 1 wherein the core-shell polymer has a core of butyl acrylate and a shell of methyl methacrylate.

9. The damping structure of claim 1 wherein the rubbery particles are styrene:butadiene rubber.

10. The damping structure of claim 1 wherein the core-shell polymer has a core of styrene:butadiene rubber and a shell of methyl methacrylate.

11. In a damping structure incorporating a layer of brittle viscoelastic material, the improvement comprising incorporating in said layer a sufficient amount of rubbery polymer particles to render said viscoelastic layer less susceptible to shock at room temperature or below and further wherein the rubber particles comprise a rubbery core surrounded by a thin shell of a polymeric material that is compatible with the viscoelastic material.

12. The damping structure of claim 2 wherein the viscoelastic layer comprises a matrix of a brittle copolymer of 20-30 parts acrylic acid and correspondingly 80-70 parts isooctyl acrylate and, dispersed throughout said matrix of brittle copolymer 5-10 parts of compatible core-shell polymer.

13. A damped laminate comprising the damping structure of claim 1 adhered to a substrate.

* * * * *